M. CHOPIN.
AUTOMATIC INDICATOR OF THE PROPORTION OF MOISTURE.
APPLICATION FILED AUG. 7, 1920.
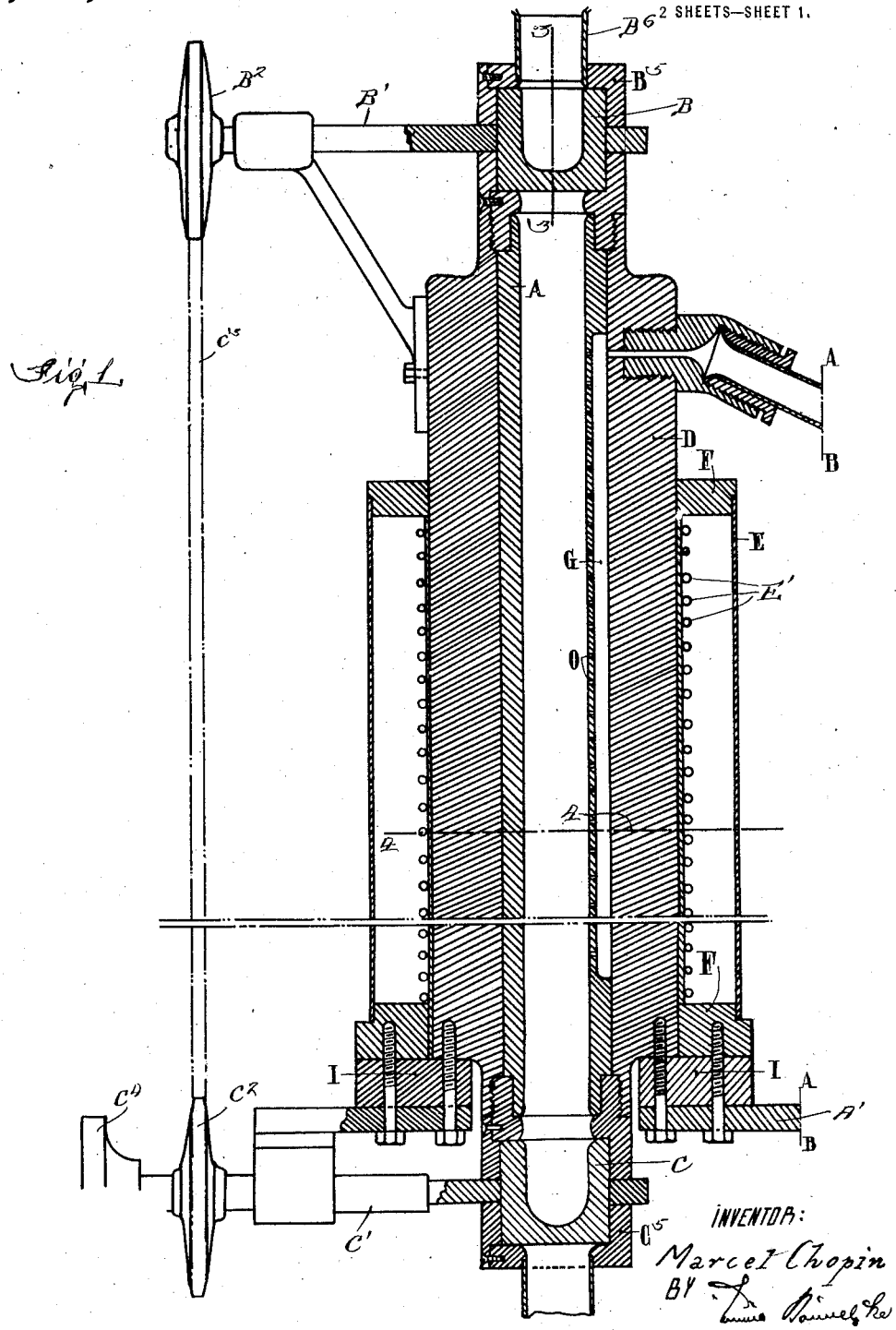

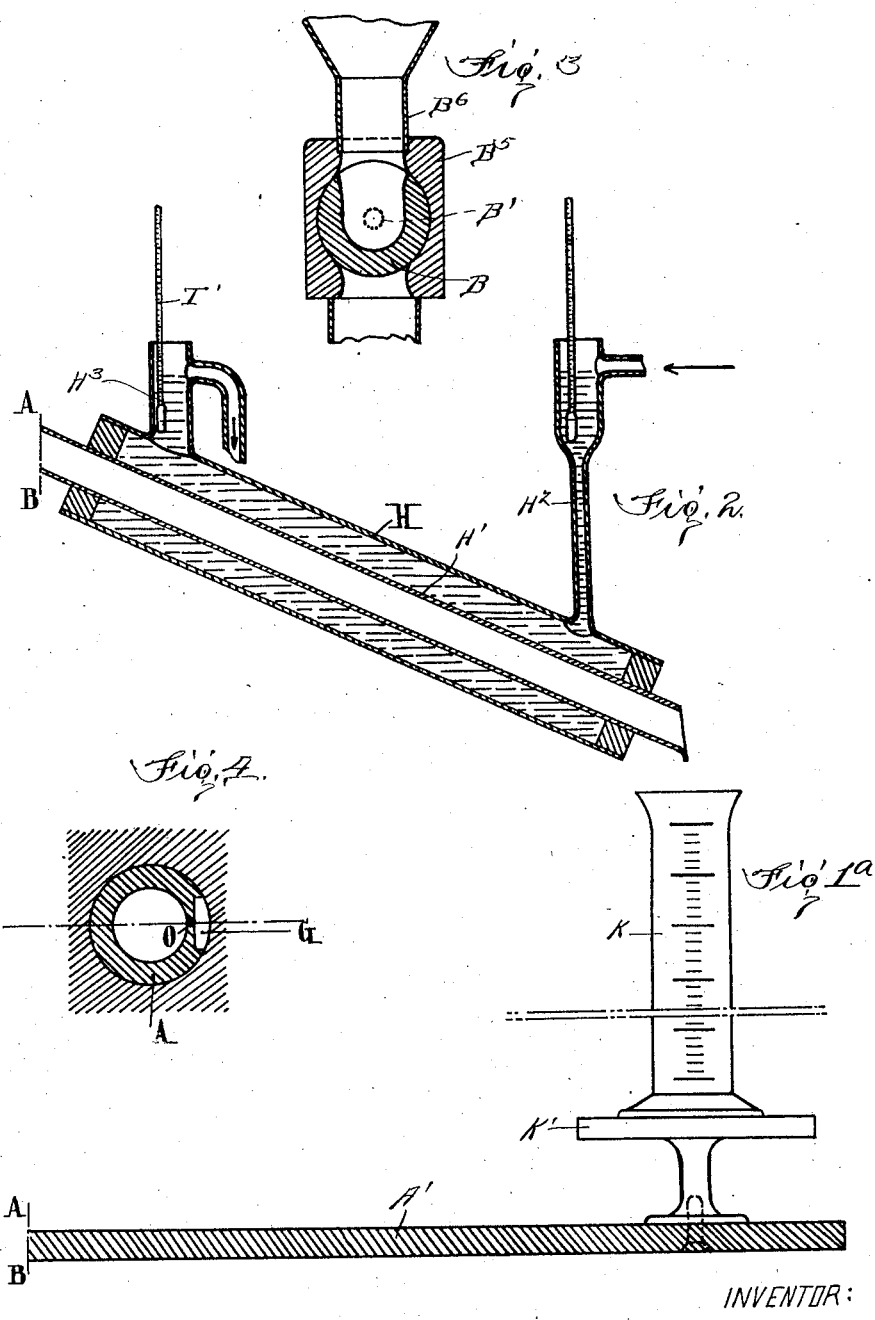

UNITED STATES PATENT OFFICE.

MARCEL CHOPIN, OF NANCY, FRANCE, ASSIGNOR TO HIMSELF AND LA SOCIETE ANONYME DES GRANDS MOULINS DE VILGRAIN, OF NANCY, FRANCE.

AUTOMATIC INDICATOR OF THE PROPORTION OF MOISTURE.

1,392,116. Specification of Letters Patent. Patented Sept. 27, 1921.

Application filed August 7, 1920. Serial No. 401,995.

*To all whom it may concern:*

Be it known that I, MARCEL CHOPIN, a citizen of the Republic of France, and resident of Nancy, France, 20 Rue Granville, have invented a new and useful Automatic Indicator of the Proportion of Moisture, (for which I have filed an application for patent in France May 9, 1919, and for an addition Dec. 20, 1919,) which indicator is fully set forth in the following specification.

This invention relates to an apparatus for automatically and continuously determining the proportion of water contained in pulverulent or granular or other materials, more particularly in cereals, the apparatus being especially adapted for use in flour mills where the said proportion plays an important part, both from the point of view of the manufacture and from the economic point of view.

In the improved apparatus the substance submitted to the test, which substance will be assumed to be wheat is introduced, continuously or periodically, into a chamber heated to a temperature sufficiently high to bring about quick evaporation of the water contained in the wheat, but on the other hand moderate enough to prevent the volatile elements of the wheat from being distilled to an appreciable extent.

Introduction of wheat into, and its discharge from, the chamber are effected through two valves so arranged that their working does not interfere in any material way with the pressure in the interior. The dimensions and the arrangement of the chamber are such that a very small distance separates the grains of the wheat from the heating walls. During the movement of wheat in the chamber its temperature gradually rises, and at the same time the water contained in the wheat is evaporated, and the speed of evaporation which is at first very low, quickly passes through a maximum, in order to become negligible at the moment of discharge of the wheat.

It is obvious that the quantity of steam generated per unit of time by the whole of the wheat contained in the chamber, gives a measure of the proportion of water in the wheat tested. It is in fact equal to the quantity of steam given off by the wheat introduced in the same time into the apparatus.

The indications given by the apparatus depend: (1) on the weight of the material tested, which passes through the apparatus per unit of time; (2) on the temperature reached by the walls of the heating chamber.

The quantity of material handled depends, in its turn, on the speed of control of the valves, and on the apparent specific gravity of the material submitted to the test. It has been found, on the one hand, that the valves could be controlled by a slow continuous movement of rotation, variations of 2–3% in the control speed being admissible; on the other hand, that the quantity of material handled had to be controlled by the discharge valve for the dried material.

As regards application to cereals, it has been found that the weights per hectoliter of dried cereals, vary very little, and that a correction of the result indicated is generally unnecessary.

The influence of variations of temperature is easily eliminated by using a considerable heating surface relatively to the quantity of material handled, so that the quantity of steam given off by the material contained in the bottom of the heating column should be negligible. On the other hand, it is advisable to stabilize temporary variations of the source of heating, by using a heater of a great thermic capacity.

The quantity of steam could be determined by various methods already known.

For instance, the said steam could be condensed in a surface condenser, the measurement being effected by collecting the water of condensation in a test tube or flask graduated direct in % of moisture, the reading being taken every hour for instance.

The condenser could also be fed with a current of cooling water, of constant quantity.

The difference of temperature read at the outlet and at the inlet of the current of water, is a function of the weight of steam condensed per unit of time, and consequently of the proportion of moisture in the material tested.

An embodiment of the invention is illustrated in the accompanying drawing, in which Figures 1 and 2 represent, in diagrammatic vertical section, the left and right hand portions of the improved apparatus; and Fig. 1ᵃ the receptacle receiving the condensed fluid, said receptacle being shown in side elevation. Fig. 3 is a vertical section of the inlet valve taken on line 3—3, Fig.

1; and Fig. 4 is a detail horizontal section through the heating chamber on line 4—4, Fig. 1.

The column of wheat subjected to desiccation, is contained in the interior of the bronze sleeve A. This tube is connected at its two ends to two valves B and C, each comprising a cylindrical casing provided with a cavity which makes it possible to pass, at each rotation of the valve, a constant volume of wheat from the upper to the lower part.

The sleeve A is mounted in the interior of a cast iron body D having the shape of a cylinder carrying at its two ends the casings $B^5$ and $C^5$ for the two valves, the casing $B^5$ having connected to it the feed hopper $B^6$ and the casing $C^5$ having connected to it the discharge spout $C^6$. This cylinder is laterally heated by an electric resistance $E'$ mounted in the interior of a sheet metal casing E and closed by covers F. The space comprised between the resistance and the casing, is filled with a material which is a non-conductor of heat.

The cast iron cylinder is intended for the three following purposes: to render uniform the temperature along the wheat column, to render, by its great calorific inertia, the temperature independent of any variations of tension in the circuit supplying current to the resistance $E'$ (at least within certain limits), and to constitute a rigid connection between the two valves.

In order to avoid an excessive waste of heat at the base, the cast iron cylinder rests on four blocks of fibro-cement I.

The escape of the steam given off by the wheat, takes place in the following manner:

The bronze sleeve A is provided outside with a longitudinal groove G along a generatrix, with orifices O at intervals of 1 cm. The steam generated at the different levels of the column of wheat, thus finds a direct way for passing into the surface condenser. The latter is here shown as comprising spaced outer and inner tubes H and $H'$, the inner tube being open at its opposite ends and communicating at its upper or inlet end with the upper end of groove G, while its lower end is arranged to discharge the water of condensation into a measuring flask K mounted on a support $K'$ fixed to the base $A'$ of the apparatus, said flask being graduated to indicate percentages of moisture. The space between the condenser tubes H and $H'$ is closed at opposite ends and is designed to receive a current of cooling water of constant quantity which is supplied thereto through a neck $H^2$ and flows off through a second neck $H^3$, the two necks being disposed, respectively, at the lower and upper ends of the condenser and being designed to receive thermometers T and $T'$ by means of which the temperatures of the water at the inlet and outlet ends of the condenser may be read.

The two valves B and C are fixed to horizontal shafts $B'$ and $C'$ which are provided with toothed wheels or sprockets $B^2$ and $C^2$ connected together for simultaneous rotation by a chain $C^3$, the shaft $C'$ being fitted with a pulley $C^4$ or equivalent operating means. The valves have a slow movement of rotation; and as the capacity of the upper valve is greater than that of the lower valve, the column of wheat always remains complete, the quantity handled by the apparatus being always insured only by the lower valve.

It goes without saying that the arrangements described are given merely by way of example, and that the invention could also be carried out in a different manner.

I claim as my invention:—

1. The method of automatically and continuously determining the percentage of water contained in pulverulent or granular material, consisting in passing the material through a chamber while maintaining a constant quantity therein, which chamber is heated to a temperature sufficiently high to convert approximately the entire moisture content of the material into steam; and then measuring the quantity of steam given off per unit of time.

2. The method of automatically and continuously determining the percentage of water contained in pulverulent or granular material, consisting in passing the material through a chamber while maintaining a constant quantity therein, which chamber is heated to a temperature sufficiently high to vaporize approximately the entire moisture content of the material; passing the vapors through a condenser; and measuring the quantity of the condensate obtained per unit of time.

3. An automatic indicator for the moisture content of pulverulent or granular material, comprising a heating chamber; means for passing the material to be treated through said chamber while maintaining a constant quantity therein; and a condenser for the vaporized moisture driven off from said material during its passage through the heating chamber.

4. An automatic indicator for the moisture content of pulverulent or granular material, comprising a heating chamber; means for passing the material to be treated through said chamber while maintaining a constant quantity therein; a conduit co-extensive with said chamber and communicating with the same throughout its entire length to receive the vaporized moisture progressively driven off from said material during its passage through the chamber; and a condenser into which the vapors are discharged from said conduit.

5. An automatic indicator for the moisture content of pulverulent or granular material, comprising a heating chamber; means for passing the material to be treated through said chamber while maintaining a constant quantity therein; a conduit for the vaporized moisture given off from the material during its passage through the heating chamber; and means for measuring the quantity of vapors passing through said conduit per unit of time.

6. An automatic indicator for the moisture content of pulverulent or granular material, comprising a heating chamber; means for passing the material to be treated through said chamber while maintaining a constant quantity therein; and a condenser in communication with said chamber to receive the vaporized moisture driven off from the material during its passage through the chamber; said condenser embodying inlet and outlet necks for a current of cooling liquid, and thermometers arranged in said necks for indicating the temperature of the liquid at its points of admission and discharge to and from the condenser.

7. An automatic indicator for the moisture content of pulverulent or granular material, comprising a chamber; inlet and discharge valves at the top and bottom of said chamber; connections for operating said valves in unison to enable the passage of the material through said chamber while maintaining a constant quantity therein; means for heating said chamber to drive off in vaporized form the moisture contained in the material; and means for measuring the quantity of vapor given off per unit of time.

8. An automatic indicator for the moisture content of pulverulent or granular material, comprising a chamber; inlet and discharge valves at the top and bottom of said chamber; connections for operating said valves in unison to enable the passage of the material through said chamber while maintaining a constant quantity therein; means for heating said chamber to drive off in vaporized form the moisture contained in the material; said heating chamber having means associated with it for progressively discharging the vapors given off from the material during its entire passage through the chamber; and means for measuring the quantity of vapor discharged per unit of time.

9. An automatic indicator for the moisture content of pulverulent or granular material, comprising a heating chamber; means for passing the material to be treated through said chamber while maintaining a constant quantity therein; means for heating said chamber to drive off in vaporized form the moisture contained in the material; said heating chamber having means associated with it for progressively discharging the vapors given off from the material during its entire passage through the chamber; and means for measuring the quantity of vapor discharged per unit of time.

In testimony whereof I have signed this specification in the presence of two subscribing witnesses.

MARCEL CHOPIN.

Witnesses:
 DAMON CLINTON WOODS,
 PAUL COUJAKKEL.